Feb. 21, 1956  P. J. ROCHFORD ET AL  2,735,408
METER
Filed May 17, 1951  4 Sheets-Sheet 1

INVENTORS
PATRICK J. ROCHFORD
ROBERT Z. HAGUE

BY *Strauch, Nolan & Diggins*

ATTORNEYS

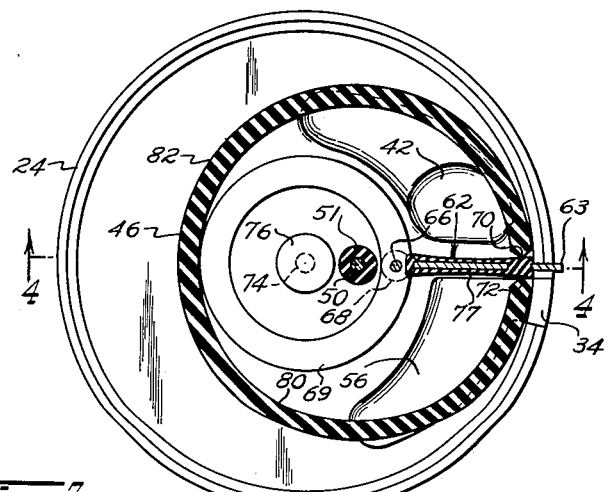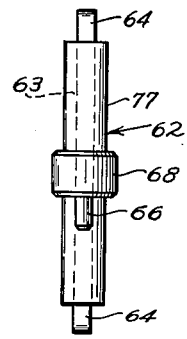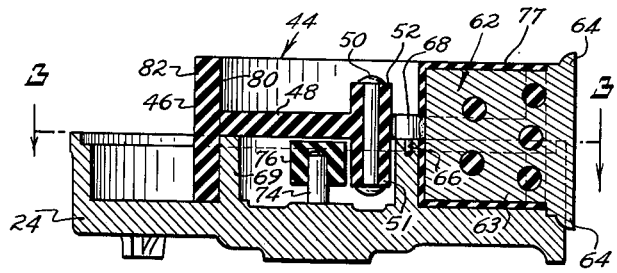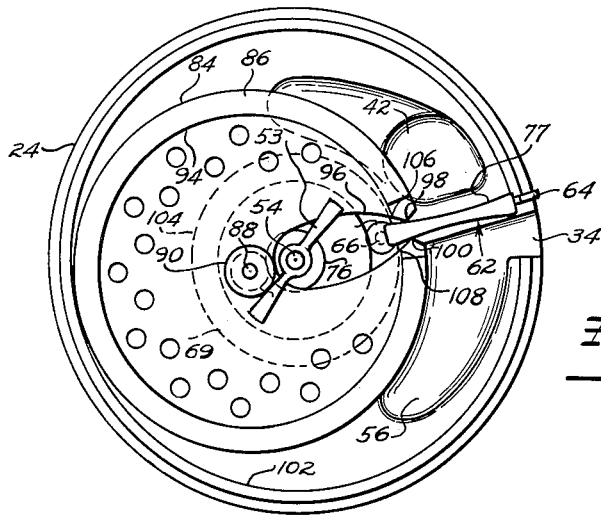

Feb. 21, 1956 P. J. ROCHFORD ET AL 2,735,408

METER

Filed May 17, 1951 4 Sheets-Sheet 3

INVENTORS
PATRICK J. ROCHFORD
ROBERT Z. HAGUE
BY Strauch, Nolan & Diggins
ATTORNEYS

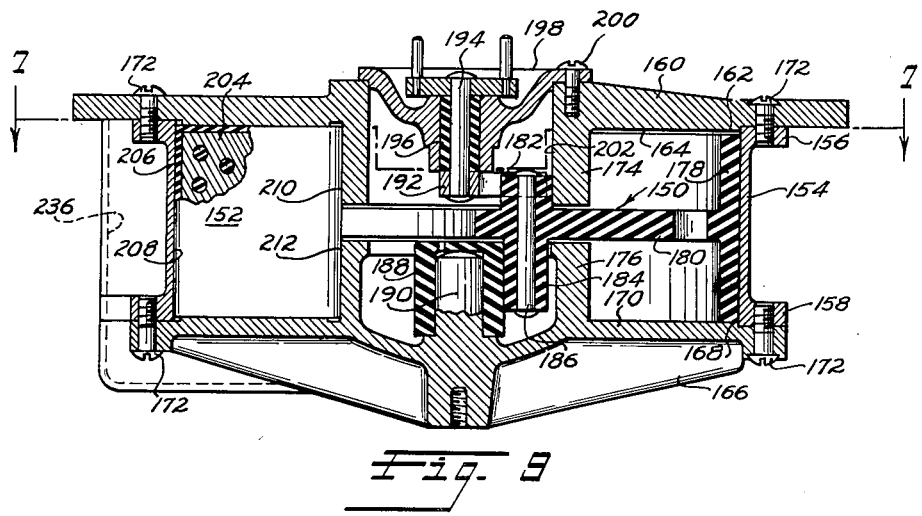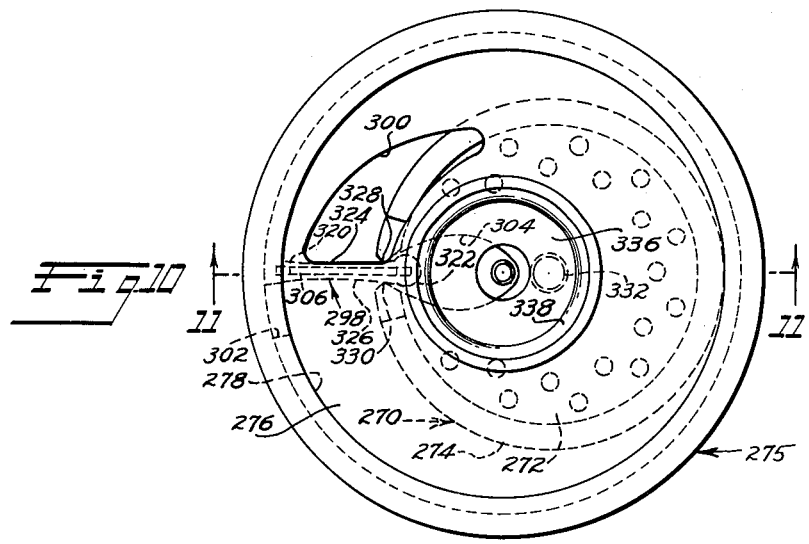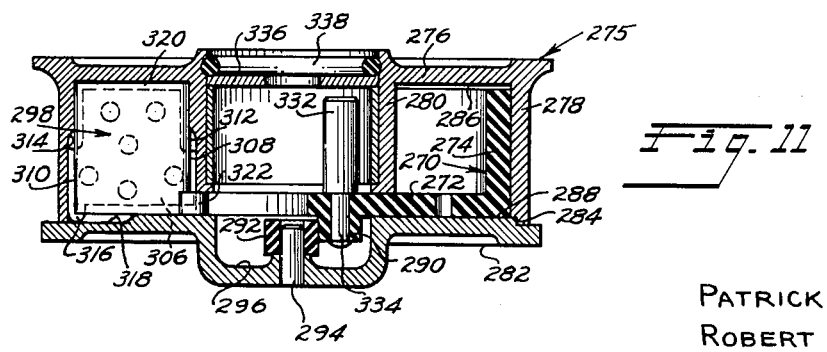

United States Patent Office 2,735,408
Patented Feb. 21, 1956

2,735,408

METER

Patrick J. Rochford, Hoboken, and Robert Z. Hague, Oradell, N. J., assignors to Rockwell Manufacturing Company, Pittsburgh, Pa., a corporation of Pennsylvania Application May 17, 1951, Serial No. 226,836

11 Claims. (Cl. 121—68)

This invention relates to improvements in fluid flow meters and more particularly to improvements in fluid flow metering devices of the oscillating piston type, of which those disclosed in the Patents No. 2,410,852 and No. 2,406,877 to Alexander R. Whittaker, issued November 12, 1946 and Sepetmber 3, 1946, respectively, and Patent No. 2,425,720 issued August 19, 1947 to C. P. Bergman are examples. In fluid flow meters of this type, many efforts have been made in the past to reduce the noise created by the oscillation of the piston. It has been found that, in meters of this type, noise is caused primarily by the striking of the edges of the opening in the annular rim of the piston against the division plate and also to some extent by the discontinuity in contact during the oscillating cycle between the annular rim of the piston and its cylindrical guides at the opening in the rim portion of the piston. The noise created by this later source is somewhat analogous to that produced by a flat portion on the outer surface of a rolling wheel. Certain efforts have been made in the past to eliminate the former source of noise by preventing contact between the opening in the rim portion of the piston and the division plate. An example of such an attempt is the guide pin and slot arrangement disclosed in Patent No. 2,410,852 previously mentioned. This arrangement, while satisfactory from the noise reduction standpoint, is not completely satisfactory because extra parts which are subject to wear and breakage are required. The addition of these extra parts results in increased initial and operating cost of the meters.

Other attempts to make the operation of the piston more quiet have taken various forms. Pistons have been linked to the chamber with guide arms to prevent contact with the division plate. Division plates having a special cross-section to allow for more perfect guiding of the piston have been made. These attempts proved unsatisfactory because of rapid wear of the intricate and precise parts required.

The improved structure constituting the present invention presents an entirely satisfactory solution to this long standing problem of noise reduction. Meters embodying this improved structure have been tested extensively in comparison with prior meters of the oscillating piston types and have been found to be quiet at all rates of flow from ¼ gallon per minute to 20 gallons per minute, whereas prior meters tested under the same conditions were found to be noisy.

It is accordingly the primary object of this invention to provide an oscillating piston type fluid meter of an improved construction which will reduce to a minimum the noise created by the oscillatory motion of the piston within its measuring chamber.

A more specific object of this invention is to eliminate the noise created by the striking of the edges of the opening in the rim of the piston against the division plate without the need of extra parts subject to rapid wear.

A further important object of this invention is to provide a flow division member for oscillating piston type meters of an improved construction for more accurately guiding the piston oscillation and for absorbing vibrations created by the striking of the piston against the flow division member.

An ancillary object of this invention is to provide an improved piston for meters of this type whereby the noise created by the discontinuity in contact between the annular rim portion of the piston and its cylindrical guides during the piston oscillatory cycle is eliminated.

Other objects of this invention will become apparent from the more detailed description which follows in reference to the drawings wherein:

Figure 1 is a fragmentary vertical section front elevation of the meter assembly;

Figure 2 is a sectional plan view of the meter assembly taken along the line 2—2 of Figure 1;

Figure 3 is a sectional plan view of the measuring chamber assembly taken along the line 3—3 of Figure 4;

Figure 4 is a vertical sectional view of the measuring chamber assembly, taken along the line 4—4 of Figure 3;

Figure 5 is an end view of the division plate assembly;

Figure 6 is a plan view of the lower half of the measuring chamber assembly showing the eccentric piston;

Figure 9 is a vertical section view of the measuring chamber assembly of a compound meter taken along the line 9—9 of Figure 7;

Figure 10 is a plan view of a measuring chamber assembly of an oscillating piston type fluid meter adapted for use with a magnetically driven register mechanism; and Figure 11 is a vertical section of the measuring chamber of Figure 10 taken along the line 11—11 of Figure 10.

*General description of meter structure*

Figure 7:
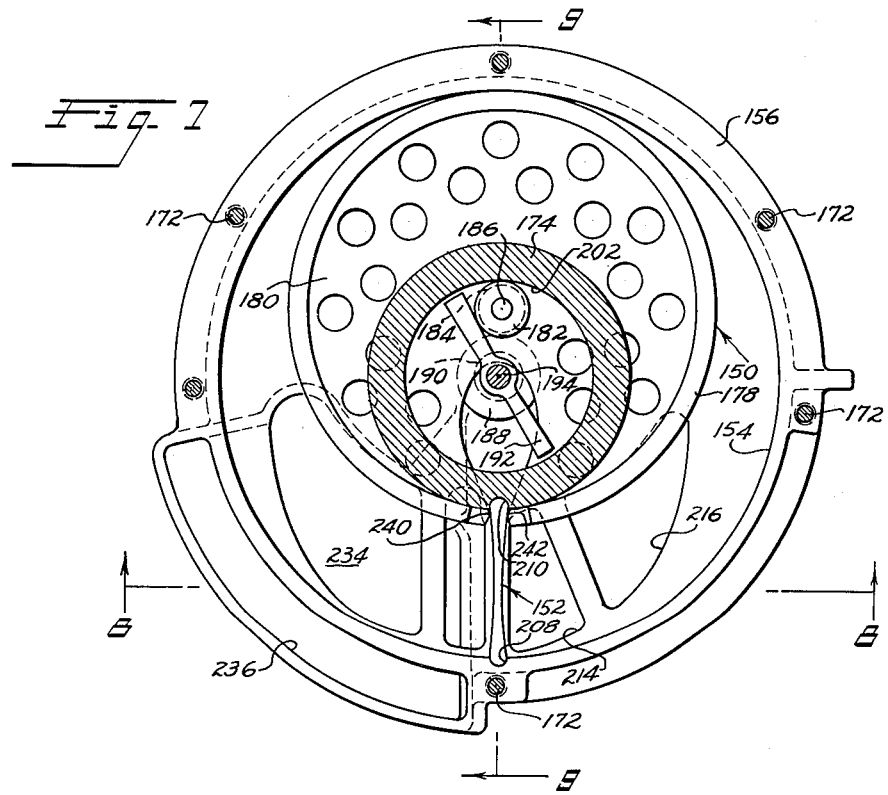
Figure 7 is a sectional plan view of a measuring chamber assembly of a compound meter taken along the line 7—7 of Figure 9.

Reference is first made to Figures 1 and 2 of the drawings wherein a meter of the type disclosed in the aforesaid Whittaker patents is shown. The meter comprises a meter body 12 having integrally cast inlet and outlet connections 14 and 16. The meter body is closed at the bottom by means of a frost plate 18 which is bolted against the open bottom of meter body 12 by means of four bolts 20 (Figure 2). These pass through ears having open slots, there being four such ears cast integrally with the meter body, and another four cast integrally with the frost plate 18. In the present embodiment the heads of the bolts are T-shaped, as shown in Figure 2. A gasket 22 (Figure 1), made of rubber or other suitable soft material, is disposed between the meter body 12 and the frost plate 18.

The measuring chamber comprises a lower portion 24 and an upper portion 26 secured together having mating annular shoulders forming a joint at 28. Preferably said chamber is made of bronze. An intermediate train of gearing (not shown), driving a register (not shown), is housed in a gear housing 32 also preferably made of bronze. The top of the measuring chamber acts as a bottom for the gear housing. Appropriate hard rubber bushings are provided for the various shafts, so that water surrounding the measuring chamber and gear housing may act as a lubricant. However, the gear housing itself is enclosed, and may carry a heavy oil or grease for lubrication of the meshing gear teeth.

The measuring chamber is generally cylindrical, and is formed with upright or axially directed contact surfaces on the outside. Referring to Figure 2 there is a main contact surface 33 around the water passage 34 (in this case an outlet passage). Additional contact surfaces are provided at 36 and 38. The contact surfaces at 33 and 38 are also visible in Figure 1. All of these contact surfaces are substantially cylindrical, but are preferably slightly tapered or conoidal so as to facilitate insertion of the inner parts into and removal from the meter body. The meter body is provided with mating contact surfaces to properly locate the measuring chamber within the meter body. Considered in another aspect, the purpose of the narrower contact surfaces 36 and 38 is to hold the main wide contact surface at 33 tightly against the mating contact surface of the meter body with a leakproof fit, so that there will be no leakage between the inlet water surrounding the measuring chamber and the discharge water flowing outwardly through the port 34.

Inasmuch as the general structural features and mode of operation of this meter are set forth in greater detail in the Whittaker patents previously mentioned, they need not be described in excessive detail here. However for clarity it is believed advisable to briefly point out that water from inlet 40 fills the meter body and surrounds the measuring chamber and gear housing. It flows into the measuring chamber through ports 42 in the top and bottom walls of the measuring chamber. The port 42 in the bottom is shown in Figure 2, and a similar passage is provided directly thereover in the top. The piston 44 is a hard rubber piston of the oscillating type, and comprises an outer annular rim 46 with a horizontal, perforated web 48 halfway between the top and bottom of the outer rim 46 of the piston 44. A stud 50 projects upwardly and downwardly from the web 48, the bottom projection extending through a hard rubber cylindrical boss 51 integral with the piston 44 acting as a guide, and the top projection extending through a hard rubber cylindrical boss 52 of larger outer diameter also integral with the piston 44 acting to turn a dog 53 on a shaft 54 projecting upwardly into the gear housing. The specific details of the piston structure will be described in greater detail hereinafter.

The water leaving the meter flows through passages 56 in the top and bottom walls of the measuring chamber. These are blind recesses which lead to the upper and lower ends of the outlet port 34, the latter extending almost but not all the way from the top to the bottom of the contact surface. The outlet port 34 registers with a mating port 58 in the meter body, said port leading directly to the outlet connection 16.

The incoming and outgoing liquid is divided by a division plate assembly or bridge 62. Since a detailed description of this assembly will be given hereinafter, it will suffice for the present to point out that this assembly has a rigid substantially rectangular plate 63, the outer edge of which is held in position by lugs or projections 64 (Figures 1 and 4) which are received in mating grooves milled onto the top and bottom of the measuring chamber at one side of the exit port 34 and the inner edge of which is held in position by the engagement of the pin 66, which depends from hub 68 fixed centrally to the inner edge of the plate 63, with a hole on the annular guide ring 69 on the bottom of the measuring chamber. The division plate assembly 62 is interposed between the edges 70 and 72 of an opening in the outer rim 46 of the piston 44 as is best shown in Figures 2 and 3.

As viewed in Figures 2 and 3, the incoming liquid entering through inlet ports 42 causes the piston 44 to oscillate in a counterclockwise direction about the guide pin 74, which is fixed vertically in the center of the lower half of the measuring chamber, and cap 76 mounted for free rotation thereon. The stud 50 on the center of the piston 44 travels in a substantially circular path around the central pin 74 while the edges 70 and 72 of the opening on the annular rim 46 reciprocate along a substantially linear path along the division plate assembly 62. The register (not shown) is driven through suitable reduction gearing (not shown) by the engagement of the upper boss 52 with the dog 53 to register the total number of cycles of oscillation of the piston 44 and thereby indicate the volume of liquid that has passed through the measuring chamber.

The mode of operation of oscillating piston type meters has been improved by certain structural modifications of the division plate and piston which will now be described.

Division plate assembly construction

In prior art meters of this type, the flow division members or division plate assemblies, which divide the incoming liquid in the measuring chamber from the outgoing liquid, have generally been constructed entirely of metal. In such meters, the edges of the division plate opening in the piston rim strike the metal division plate and thereby create an objectionable noise. In the present improved construction, the surfaces of the division plate which the edges 70 and 72 of the piston rim 46 contact have been covered with a flexible covering material shaped to guide the piston and made of suitable material to absorb vibration. Soft rubber has been found quite suitable as covering material for this purpose. In its present form, the covering material is molded or vulcanized on the division plate 63 so as to provide a substantially permanent assembly but may of course be placed thereon in any suitable manner.

As may be seen in Figures 3 and 4, the rectangular portion of the division plate 63 lying between the guide ring 69 and the chamber wall 24 is covered with flexible rubber, this covering being designated 77. Covering 77 is thicker along the edges adjacent ring 69 and wall 24 and thinner at the center midway between.

The surfaces of covering 77 are so shaped as to guide the motion of edges 70 and 72 with the least possible clearances. Guiding with no clearance at all is rendered impossible by the theoretical limitations of the mechanism. Slight additional clearances are provided between the edges 70 and 72 and the surface of the covering 77 to accommodate the slight variations in the size of the opening between edges 70 and 72 due to variations in temperature of the fluid passing through the meter. Since the clearance between the edges 70 and 72 and the division plate assembly is slight throughout piston oscillatory cycle, the edges 70 and 72 will strike with less force and therefore create vibration of less magnitude. However, since the formed covering material is flexible, it will absorb any vibrations thus created. The surfaces of the flexible covering 77 are preferably very smooth to reduce friction between the piston 44 and the division plate assembly 62 to a minimum. As is best seen in Figure 4, the flexible covering 77 covers the upper, lower, and inner edges of plate 63 forming a flexible but leakage resistant seal between the plate 63 and the measuring chamber and preventing the transmission of vibrations from the plate to the chamber walls.

Since the division plate is covered with flexible rubber, the vibrations which are created by the striking of the edges of piston rim slot against the contacted surfaces of the division plate assembly are absorbed for the most part by the flexible covering material rather than transmitted to the metallic reinforcing plate. Since the surfaces of the division plate assembly which are contacted by the edges of the piston rim are so formed that they guide the movement of the piston during its oscillatory cycle, the tendency of the piston rim edges to strike the division plate assembly is reduced to a minimum. The formed flexible covering of the division plate assembly thus provides the best possible guide for the piston and absorbs any vibration which results from the unavoidable clearances between the edges of the piston rim slot and the division plate assembly.

Concentric piston construction and operation

As shown in Figures 1 to 4, the oscillating piston is substantially conventional in form, comprising an outer annular rim portion 46 with a horizontal, perforated web 48 midway between the top and bottom of the outer rim 46. As may be seen in Figure 2, an opening 78 is provided through the outer rim 46 and in the web 48, the opening on the web 48 being so shaped that the stationary hub 68 will not interfere with the movement of the piston 44 during its oscillatory cycle, that is, the curvature of the edge of opening 78 on the web 48 is substantially that of the path generated by the relative motion of the hub 68 and the piston 44 during the piston oscillatory cycle. The diameter of the internal cylindrical surface 80 of the piston rim 46 is concentric with the exterior cylindrical surface 82 and with the central stud 50, being of such magnitude that surface 80 contacts the outer cylindrical surface of guide ring 69 to guide the motion of the piston throughout the piston oscillatory cycle while a slight clearance is maintained between external surface 82 and the cylindrical wall. For example, a clearance of .003 inch for a nominal 5/8" meter at 70° F. has been found to be satisfactory.

Meters having the improved division plate assembly coacting with a generally conventional piston have proved to be uniformly satisfactory in the reduction of noise.

*Eccentric piston construction and operation*

As indicated at the outset, an ancillary source of noise in meters of this type is the discontinuity in contact between the annular piston rim and its cylindrical guide surface, whether it be the chamber wall or the central guide ring. This discontinuity occurs at the division plate opening in the rim. This invention further contemplates the elimination of this ancillary source of noise by providing a piston of improved construction. In the improved piston construction shown in Figure 6, the outer cylindrical surface 84 of the rim 86 is concentric with the central stud 88 and bosses 90 and 92, while the inner cylindrical surface 94 of the rim 86 is eccentric thereto, its axis being displaced slightly from the axis of the stud 88 along a radial bisector of the opening 96 between the edges 98 and 100 in the annular rim 86 toward the opening. In the present embodiment, an eccentricity of approximately .004" has been found to be satisfactory.

With the piston modified in this manner, its mode of operation in the measuring chamber is also modified as will now be described. As previously pointed out, the motion of pistons having concentric internal and external cylindrical rim surfaces is guided either by contact between the inner cylindrical surface of the rim with the outer cylindrical surface of the central guide ring or by contact of the outer cylindrical surface of the rim with the inner cylindrical side walls of the upper and lower portions of the measuring chamber throughout the entire oscillatory cycle of the piston. Neither of such constructions eliminates the slight noise created by the discontinuity in rolling contact due to the opening in the annular rim. If the piston is constructed with its inner cylindrical surface 94 of the rim 86 eccentric to its outer cylindrical surface 84 in the manner described this source of noise is also eliminated. For approximately one half of the oscillatory cycle of the piston, the motion of the piston is guided by contact between the outer cylindrical surface 84 of the rim 86 and the inner side wall 102 of the measuring chamber as illustrated in Figure 6, while during the other half cycle the motion of the piston is guided by contact between the inner cylindrical surface 94 of the rim 86 and the outer surface 104 of the guide ring 69. The portion of the rim having the division plate opening therein is thus prevented from contacting either the inner side wall 102 of the measuring chamber or the outer surface 104 of the guide ring 69. The noise created by the contact at the edges 106 and 108 of the opening with these cylindrical guiding surfaces is thus completely eliminated.

*Measuring chamber for compound meters*

Figure 8:
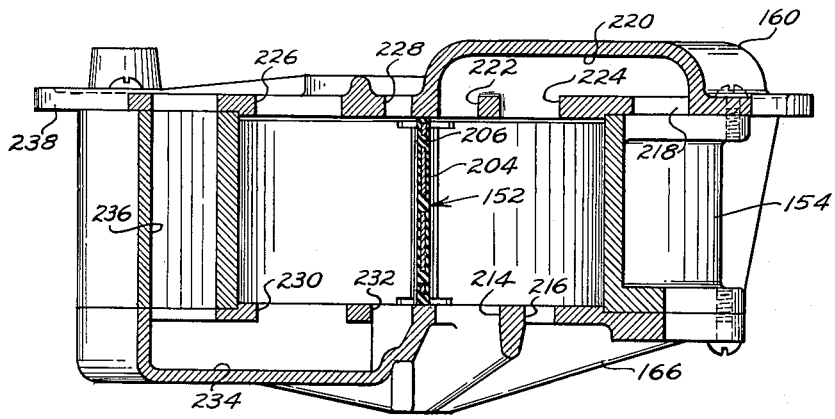
Figure 8 is a vertical sectional view of the measuring chamber assembly of a compound meter taken along the line 8—8 of Figure 7.

An improved oscillating piston type measuring chamber assembly of a type adapted for use in compound meters such as that disclosed in the aforesaid Bergman Patent No. 2,425,720, is shown in detail in Figures 7, 8, and 9. Measuring chambers of this type are adapted to be mounted in and in fluid tight relationship with an aperture of a dividing wall between the fluid inlet and outlet sides of such a meter. In such meters, the oscillating piston type measuring chamber assembly forms a passage through the dividing wall through which fluid flows from the inlet to the outlet of the meter casing. In the usual arrangement of such compound meters, the axis of the oscillating piston type measuring chamber assembly is vertical and the plane of the dividing wall is substantially horizontal.

As is best shown in Figures 7 and 9, the structure of the measuring chamber and oscillating piston of this type of meter is quite similar to that disclosed in the previous embodiment. As in the previous embodiment, a slotted piston 150 straddling a division plate assembly 152 is guided for oscillatory movement within a substantially cylindrical measuring chamber defined by the measuring chamber body. In this type of measuring chamber, the measuring chamber body is formed of a cylinder 154 having annular flanges 156 and 158 at the top and bottom thereof, a top cover member 160 formed with a boss 162 piloted within the upper end of the cylinder 154 and having a substantially planar surface 164 normal to the axis of the cylinder 154 to define an upper end closure for the cylinder, and a bottom cover member 166 having a boss 168 piloted within the lower end of the cylinder 154 and a substantially planar surface 170 to define a bottom end closure therefor. The top and bottom cover members 160 and 166 are secured to the cylinder 154 by a plurality of screws 172 passing through apertures formed through members 160 and 166 and threadedly engaged with aligned tapped holes formed in the flanges 156 and 158 of the cylinder 154. Coaxially aligned hollow bosses 174 and 176 are respectively formed integral with the top cover 160 and the bottom cover 166 to form central guide rings concentric with the cylinder 154 for guiding the movement of the piston 150 during its oscillatory cycle.

Piston 150, as shown, is of the concentric rim, center web type having a cylindrical rim portion 178 and a web portion 180 substantially midway between the top and bottom edges of the rim portion 178 and substantially normal to the axis thereof. A boss 182 is formed integral with the web portion 180 on the upper face thereof and a slightly smaller cylindrical boss 184 which is also formed integral with web 180 depends from the lower face thereof. Bosses 182 and 184 are coaxially aligned with the rim 178 and are provided with a reinforcing stud 186 passing concentrally therethrough. The oscillatory movement of the piston 150 is guided partly by the engagement of boss 184 with a roller cap 188 which is rotatably mounted upon a pin 190 formed integral with the bottom cover 166 and coaxial with the cylinder 154.

The boss 182 engages a dog 192 fixed to a shaft 194 which is operatively connected by means (not herein shown) to drive the register mechanism of the meter assembly. Shaft 194 is rotatably mounted in a bearing 196 which is fixed to the plug 198 that is fixed as by screws 200 to the top cover 160 to close the end of the bore 202 through the hollow boss 174. If additional information is found to be necessary to the understanding of the measuring chamber assembly of this embodiment of our invention, reference is made to the aforesaid Bergman patent.

The division plate assembly 152 of this form of measuring chamber comprises a central perforated metallic reinforcing plate 204 upon which is moulded or vulcanized a covering 206 of flexible material such as soft rubber. This division plate assembly 152 differs from that of the previous embodiments in that the reinforcing plate 204 thereof does not contact the measuring chamber at any point. The division plate assembly 152 is held in position within the measuring chamber by the interlocking of the covered outer edge thereof with a groove 208 formed interiorally of the wall and parallel to the axis of the cylinder 154 and by the engagement of the inner edge thereof with aligned grooves 210 and 212 formed longitudinally of the external cylindrical surfaces of the bosses 174 and 176.

Since, in measuring chamber assemblies having central web pistons such as this, the fluid must be introduced to and discharged from the chamber both above and below the piston, the passages leading to and from the measuring chamber of a compound meter differ from those shown in the previous embodiments due to the location of the measuring chamber between the inlet and outlet ports of the meter casing previously described. As is best shown in Figures 7 and 8, the fluid to be measured enters the measuring chamber through ports 214 and 216 formed through the bottom cover 166 and through an arcuate aperture 218, the passage 220 and openings 222 and 224 in the top cover 160. The metered fluid is discharged from the measuring chamber on the opposite side of the division plate assembly 152 through apertures 226 and 228 in the top cover 160 and through apertures 230 and 232, the horizontal passage 234 in the bottom cover 166, and upwardly through the arcuately shaped channel 236 in the cylinder 154.

As previously indicated, this measuring chamber assembly is adapted to be mounted on an aperture through a dividing wall between the inlet and outlet sides of a compound meter. When so mounted, the flange 238 around the measuring chamber top cover 160 rests upon and is in sealed engagement with the top of this dividing wall while the cylinder 154 and the bottom cover 166 extend down and into the inlet side of the compound meter assembly through the aperture. Thus the fluid to be measured must pass from the inlet chamber below the measuring chamber, through the measuring chamber and into the outlet chamber above.

It will be noted by reference to Figure 7, that as in the previous embodiment of the division plate assembly, the surfaces of the covering material of the division plate which are contacted by the edges 240 and 242 of the slot in the rim 178 of the piston 150 are curved to guide the motion of the piston with a minimum clearance throughout the oscillatory cycle of the piston. Only such clearance between the edges 240 and 242 and the contacted surface of the division plate 152 exist as are necessary due to the inherent characteristics of the movement of the piston in such a mechanism.

*Oscillating piston type meter for magnetically driven register*

A measuring chamber assembly for an oscillating piston type meter having a magnetically driven register is disclosed in Figures 10 and 11. One form of oscillating piston type meter having a magnetic drive connection to the register mechanism is disclosed in United States Patent No. 2,487,783 issued November 15, 1949 to C. P. Bergman. In meters of this type, it has been found that the necessary magnet coupling length may be provided without unduly increasing the height of the measuring chamber by using a slotted piston having a web located at the bottom of the rim portion rather than one having a centrally located web as disclosed in the Bergman patent. Accordingly, the slotted piston 270 of the embodiment of our invention disclosed in Figures 10 and 11 has a bottom web portion 272 and a rim 274 formed integral therewith around the periphery thereof.

The measuring chamber casing of this embodiment is formed of an upper member 275 having a top wall 276 and a cylindrical wall 278 and a cylindrical guide ring 280 formed integral therewith in mutual concentric relation and a bottom cover 282 formed with a boss 284 piloted within the open end of the cylindrical portion 278. The internal surfaces 286 and 288 of the top wall 276 and the bottom member 282 respectively are parallel planar surfaces perpendicular to the axis of the cylindrical wall 278. A cylindrical measuring chamber within which the piston 270 is mounted for oscillatory movement is thus defined.

A boss 290, formed integral with the web 272 and concentric with the rim portion 274 of the piston 270, depends from the bottom surface of the web 272 and guides the movement of the piston by engagement with a roller 292 mounted for rotation upon a shaft 294 fixed in an aperture through cover 282 coaxial with the recess 296 in the bottom cover 282 which is coaxial with the cylindrical portion 278 of the meter casing.

A flow division plate assembly 298 embodying the characteristics of our invention is mounted within the measuring chamber cylinder extending radially of the measuring chamber between the cylindrical wall 278 and the guide ring 280 and lying intermediate an inlet port 300 formed through the top wall 276 and an outlet port 302 formed through the cylindrical wall 278. As is best shown in Figure 10, the piston 270 is of the slotted type having a slot 304 straddling the flow division plate assembly 298. As is best shown in Figure 11, the flow division assembly 298 comprises a perforated reinforcing plate 306 formed at its opposite edges with projections 308 and 310 which engage slots 312 and 314 respectively of the guide ring 280 and the cylindrical wall 278. Slots 312 and 314 are preferably formed by a single milling operation. A depending ear 316, formed at the bottom of the plate 306, engages a slot 318 milled in the surface 288 of the bottom member 282. As in the previous embodiments, reinforcing plate 306 is covered with the exception of projections 308 and 310 and ear 316, by a flexible covering 320 which is preferably of soft rubber vulcanized thereon. The cylindrical extension 322 of the division plate assembly 298 lies intermediate the lower edge of the ring 280 and the top surface 288 of the bottom cover 282 and is formed as an integral part of the covering material 320 on the reinforcing plate 306.

The surfaces 324 and 326 contacted by the edges 328 and 330 of the slots in the piston rim are, as in the previous embodiments, formed for minimum clearance throughout the oscillatory cycle of the piston 270.

In order that a register may be driven by the piston 270, a driving magnet is mounted within the member 332 which is fixed to the piston 270 coaxially with the rim portion 274 and which has a stem 334 extending through the boss 290 for reinforcement thereof. Member 332 revolves within the bore of the guide ring 280. An apertured plate 336 is mounted within the bore of ring 280 transversely thereof and is provided with an O-ring sealing element 338 to receive in sealed relation therewith a driven magnet assembly of a type somewhat similar to that disclosed in the aforesaid Bergman Patent No. 2,487,783.

It is thus seen that the improved division plate of our invention may be adapted for use in various types of measuring chambers for oscillating piston type meters. The piston of the last two embodiments of this invention may likewise be of the eccentric piston type disclosed in Figure 6. It is therefore seen, that our invention contemplates an improved oscillating piston type meter whereby objectionable noises are eliminated primarily by the provision for such meters of a flow division member of an improved construction which is adapted to absorb vibrations created by the striking of the piston rim slot edges against the flow division member and to guide the motion of the piston, and secondarily, by the provision of a piston of improved construction adapted to further eliminate the noise heretofore created by its oscillating movement within the measuring chamber.

While our invention has been described in detail, it may be embodied in other specific forms without departing from its spirit or essential characteristics. The present embodiments are, therefore, to be considered in all respects as illustrative and not restrictive, the scope of our invention being indicated by the appended claims rather than by the foregoing description, and all changes which come within the equivalency of the claims are therefore intended to be embraced therein.

What is claimed and desired to be secured by United States Letters Patent is:

1. In a fluid meter, a measuring chamber and a rigid fluid actuated piston mounted for free oscillation therein with respect to an axis under the influence of fluid pressure applied thereto, a flow division member in said chamber between inlet and outlet ports therefor, said piston being slotted to straddle in a free sliding fit the flow division member, and shock cushioning means at all points of contact between the piston and the flow division member.

2. In a fluid meter, a measuring chamber and a rigid fluid actuated piston mounted for free oscillation therein with respect to an axis under the influence of fluid pressure applied thereto, a flow division member in said chamber between inlet and outlet ports therefor, said piston being slotted to straddle in a free sliding fit the flow division member, and shock cushion means on said flow division member at all of its points of contact with said piston.

3. In a measuring chamber for an oscillating piston type meter having a cylindrical inner wall, rigidly spaced planar top and bottom walls perpendicular to the axis of the cylindrical wall, inlet and outlet ports, and a guide ring concentric with the cylindrical wall; a division plate positioned radially within said measuring chamber between the inlet and outlet port and fixed in position by engagement with said guide ring and said cylindrical wall, and a rigid piston positioned for free oscillation within said chamber under the influence of fluid pressure exerted through said inlet port, said piston having a rim portion having a narrow opening therethrough, the division plate being interposed between the edges of the opening in the rim portion, in a free sliding fit and a shock absorbing surface on said division plate for eliminating noise created by the striking of the edges of the opening in the rim portion against the division plate.

4. In a measuring chamber for an oscillating piston type fluid meter having a cylindrical interior wall, planar top and bottom walls perpendicular to the cylindrical wall, inlet and outlet ports and a central guide ring fixed with respect to the planar walls concentric with the cylindrical wall; a flow division member positioned radially within the measuring chamber between the inlet and outlet ports and fixed in position between said central guide ring and the cylindrical wall, a piston mounted for oscillation within said chamber, said piston having a rim with a narrow opening therethrough and the division plate being interposed between the edges of the opening in the rim portion, an outer cylindrical rim surface on said piston for engagement with the cylindrical wall of the measuring chamber, and an inner cylindrical rim surface for engagement with the guide ring, the axes of said cylindrical surfaces being parallel but slightly eccentric relative to each other whereby the oscillatory motion of the piston is guided by the guide ring during a portion of the piston cycle and by the cylindrical chamber wall during the remainder of the cycle.

5. The combination as defined in claim 4, wherein the axis of the inner cylindrical rim surface is displaced from the axis of the outer cylindrical surface along a radial bisector of and toward the division plate opening in the rim portion.

6. A piston for an oscillating piston type meter comprising an annular rim portion having a cylindrical outer surface and a cylindrical inner surface, the axes of said cylindrical surfaces being parallel, a narrow division plate opening through said rim portion, and wherein the axis of said inner cylindrical surface is slightly eccentric to that of said outer cylindrical surface, being located substantially on a radial bisector of the division plate opening and in the direction of said opening.

7. An oscillating piston type fluid metering device comprising a cylindrical measuring chamber having spaced fluid inlet and outlet ports formed through the walls thereof, a flow division member fixed radially within said measuring chamber intermediate said inlet and outlet ports, a piston having an outer rim formed with a narrow opening and cylindrical inner and outer guide surfaces that are eccentric with respect to each other in the direction of said opening mounted within said measuring chamber to straddle in a free sliding fit said flow division member and adapted for free oscillation therein under the influence of fluid pressure exerted through said inlet port, said flow division member comprising a rigid plate and a body of noise and vibration cushioning material covering the surfaces of said plate that contact the edges of the opening in said piston rim.

8. A flow division member adapted to be mounted radially within and intermediate spaced inlet and outlet ports of a measuring chamber of an oscillating piston type fluid metering devices comprising a rigid metal plate and a body of resilient material molded about said plate, the opposite faces of said resilient body being outwardly concave, thinner at the center and thicker along the inner and outer ends of the plate, and the curvature of said faces being substantially that of the path generated by the edges of a piston rim slot during an oscillatory cycle of the piston.

9. In a fluid meter, a generally cylindrical measuring chamber having adjacent inlet and outlet ports, a flow division member fixed in said chamber between said inlet and outlet ports and extending radially of said chamber, a rigid fluid actuated piston mounted for free oscillation in said measuring chamber with respect to an axis thereof under the influence of fluid pressure applied thereto through said inlet port, said piston being provided with a slot to straddle in a free sliding fit said flow division member, and a shock cushioning means on said flow division member at all of its points of contact with said piston comprising a surface covering of soft resilient material permanently bonded thereto.

10. The combination defined in claim 9 wherein the thickness of such surface covering is greatest at the radial extremities of said division plate and thinnest midway of its radial length whereby a substantially uniform clearance is maintained between the external faces of said surface covering and the contacted portion of said piston throughout the oscillatory path of movement of said piston.

11. A flow division member for the measuring chamber of an oscillating piston type fluid meter comprising a rigid metal plate having a surface covering of soft resilient material permanently bonded thereto, said soft resilient material having faces on opposite sides of said plate which are substantially cylindrically concave, being thinner at the center and thicker adjacent the opposite ends of the plate, the curvature of said faces being substantially that of the path generated by the edges of the opening in the rim portion of a piston during its oscillatory cycle.

References Cited in the file of this patent

UNITED STATES PATENTS

| Number | Name | Date |
| --- | --- | --- |
| 300,628 | Nash | June 17, 1884 |
| 2,338,152 | Whittaker | Jan. 4, 1944 |
| 2,351,050 | Karey | June 13, 1944 |
| 2,449,974 | Bergman | Sept. 28, 1948 |
| 2,553,973 | Keller et al. | May 22, 1951 |

FOREIGN PATENTS

| Number | Country | Date |
| --- | --- | --- |
| 443,333 | Great Britain | Feb. 26, 1936 |